(12) United States Patent
Isoi

(10) Patent No.: US 11,054,354 B2
(45) Date of Patent: Jul. 6, 2021

(54) ANALYTICAL LIQUID MONITORING DEVICE

(71) Applicant: SHIMADZU CORPORATION, Kyoto (JP)

(72) Inventor: Takuya Isoi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 188 days.

(21) Appl. No.: 16/281,605

(22) Filed: Feb. 21, 2019

(65) Prior Publication Data
US 2019/0257731 A1 Aug. 22, 2019

(30) Foreign Application Priority Data

Feb. 22, 2018 (JP) .............................. JP2018-029665

(51) Int. Cl.
*G01N 9/04* (2006.01)
*G01G 17/04* (2006.01)
*G01G 23/36* (2006.01)
*G01G 19/414* (2006.01)
(Continued)

(52) U.S. Cl.
CPC .............. *G01N 9/04* (2013.01); *G01G 17/04* (2013.01); *G01G 19/414* (2013.01); *G01G 23/36* (2013.01); *G01N 30/02* (2013.01); *G01N 2035/009* (2013.01); *G01N 2035/00217* (2013.01)

(58) Field of Classification Search
CPC ...... G01G 17/04; G01G 19/414; G01G 23/36; G01N 9/04; G01N 30/02; G01N 2035/00217; G01N 2035/009
See application file for complete search history.

(56) References Cited

U.S. PATENT DOCUMENTS 6,315,901 B1  11/2001  Okada
7,909,208 B2 *  3/2011  Skordas ................. G01G 17/04
                                                  222/1
(Continued)

FOREIGN PATENT DOCUMENTS

JP          11-192424 A          7/1999

OTHER PUBLICATIONS

Communication dated Dec. 29, 2020, from the Intellectual Property of India in application No. 201944006773.

*Primary Examiner* — Randy W Gibson
(74) *Attorney, Agent, or Firm* — Sughrue Mion, PLLC

(57) ABSTRACT

Disposition of a wrong liquid for analysis or a liquid for analysis connected to a wrong pipe is detected as abnormal use. A liquid-for-analysis monitor includes: a weighing scale that weighs a container that contains a liquid as a liquid for analysis that needs to be used in analysis; a density storing part that stores a density $\rho$ of the liquid for analysis; and a liquid-for-analysis determining part configured to obtain a variation $\Delta M$ between a weight of the container weighed by the weighing scale before a decreasing operation that decreases the liquid for analysis and a weight of the container weighed by the weighing scale after the decreasing operation, and determine whether the liquid for analysis has been normally used in the decreasing operation or not, based on the obtained variation $\Delta M$, a volume V of the decrease in the liquid in the container in the decreasing operation, and the density $\rho$ of the liquid for analysis stored in the density storing part.

6 Claims, 3 Drawing Sheets

(51) Int. Cl.
*G01N 30/02* (2006.01)
*G01N 35/00* (2006.01)

(56) References Cited

U.S. PATENT DOCUMENTS

| | | | | |
|---|---|---|---|---|
| 7,938,032 B2* | 5/2011 | Fernando | ........... | G01G 23/3728 73/865.6 |
| 2004/0171171 A1* | 9/2004 | Appoldt | ............. | G01G 23/3728 436/180 |
| 2004/0200260 A1* | 10/2004 | Klosterman | ....... | G01N 35/1016 73/1.74 |
| 2006/0272387 A1* | 12/2006 | Klosterman | ....... | G01N 35/1016 73/1.74 |
| 2009/0139451 A1* | 6/2009 | Skordas | ................. | G01G 17/04 118/715 |
| 2010/0107752 A1* | 5/2010 | Fernando | ............ | B01F 13/1022 73/149 |
| 2016/0362290 A1* | 12/2016 | Cole | ....................... | G01F 23/20 |

* cited by examiner

ANALYTICAL LIQUID MONITORING DEVICE

BACKGROUND OF THE INVENTION

1. Field of the Invention

The present invention relates to a liquid-for-analysis monitor that monitors liquids for analysis used in an analyzer, such as a liquid chromatograph.

2. Description of the Related Art

Many conventional analyzers, such as a liquid chromatograph, detect amounts of remaining liquids used for analysis (hereinafter referred to as liquids for analysis) using level sensors, for example (see JP H11-192424 A). The detection of amounts of remaining liquids for analysis shows an appropriate time for replenishment and replacement of liquids for analysis, and also checks whether correct amounts of liquids for analysis have been used as scheduled or not, that is, whether operations that use liquids for analysis have been normally performed as scheduled or not.

Alternatively, a total amount of fed liquid is calculated from an amount of operations of a feed pump that feeds liquids for analysis so that an amount of remaining liquids for analysis and an amount of liquid in a liquid-waste container are monitored based on the total amount (see JP 2000-298122 A).

SUMMARY OF THE INVENTION

An analyzer generally uses a plurality of kinds of liquids for analysis. A user needs to dispose a plurality of containers that contain liquids for analysis in specific positions, respectively, and needs to connect the plurality of containers with specific pipes, respectively. If a wrong kind of liquid for analysis is disposed or a liquid for analysis is connected to a wrong pipe, composition of a mobile phase becomes different from an intended composition, or a liquid different from a liquid for analysis that needs to be used is used. Consequently, analysis is not normally performed.

Such a method for monitoring an amount of liquid as shown in JP H11-192424 A and JP 2000-298122 A does not consider possibility of disposition of a wrong liquid for analysis or a liquid for analysis connected to a wrong pipe. Therefore, even if a wrong liquid for analysis is disposed or a liquid for analysis is connected to a wrong pipe, the error is not detected as abnormal use if amounts of decreases in liquids correspond to scheduled amounts of consumption.

Further, a shape of a container that contains a liquid for analysis may not allow a level of a liquid surface in the container to be proportional to a volume of the liquid for analysis. In this case, a level sensor does not measure a correct amount of a remaining liquid.

It is an object of the present invention to allow detecting disposition of a wrong liquid for analysis as abnormal use or detecting a liquid for analysis connected to a wrong pipe as abnormal use.

Monitoring amounts of decreases in some liquids used in an analysis operation based on volumes of the decreases cannot determine whether the used liquids are liquids for analysis that need to be used or not, as described above. However, most different kinds of liquids for analysis have different densities. Therefore, a decrease in weight due to consumption of a fixed volume varies among different kinds of liquids for analysis. Using this knowledge allows determining whether correct amounts of correct kinds of liquids for analysis have been used or not. The present invention is made based on the findings and is characterized by determining whether liquids for analysis are normally used or not based on information on weights of containers that contain liquids as liquids for analysis and information on densities $\rho$ of the liquids for analysis.

That is, a liquid-for-analysis monitor according to an aspect of the present invention includes: a weighing scale that weighs a container that contains a liquid as a liquid for analysis that needs to be used in analysis; a density storing part that stores a density $\rho$ of the liquid for analysis; and a liquid-for-analysis determining part configured to determine a variation $\Delta M$ between a weight of the container weighed by the weighing scale before a decreasing operation that decreases the liquid for analysis and a weight of the container weighed by the weighing scale after the decreasing operation, and determine whether the liquid for analysis has been normally used in the decreasing operation or not, based on the determined variation $\Delta M$, a volume V of the decrease in the liquid in the container in the decreasing operation, and the density $\rho$ of the liquid for analysis stored in the density storing part.

The "liquid for analysis" in the present application is a general term for various liquids used in an analyzer, and includes solvents fed as mobile phases, cleaning liquids, and reagents added to samples, for example.

If liquids for analysis are normally used, liquids for analysis that need to be used are used as scheduled in decreasing operations that decrease the liquids for analysis (e.g. feeding of a mobile-phase solvent, feeding of a cleaning liquid, and adding a reagent to a sample). On the other hand, if a liquid for analysis is not normally used, a liquid different from the liquid for analysis that needs to be used is actually used in a decreasing operation that decreases the liquid for analysis, or an analyzer does not operate normally. Because a user disposes a wrong liquid for analysis or connects a liquid for analysis to a wrong pipe, a liquid different from the liquid for analysis that needs to be used is actually used.

It is conceivable that the liquid-for-analysis determining part uses, in various manners, a variation $\Delta M$ between weights of a container that contains a liquid as a liquid for analysis, and a density $\rho$ of the liquid for analysis to determine whether the liquid for analysis has been normally used or not. For example, according to one aspect, the liquid-for-analysis determining part is configured to obtain a density $\rho'$ of the liquid contained in the container by dividing the variation $\Delta M$ between a weight of the container before the decreasing operation and a weight of the container after the decreasing operation by the volume V of the decrease in the liquid in the container in the decreasing operation, compare the obtained density $\rho'$ with the density $\rho$ of the liquid for analysis stored in the density storing part, and determine that the liquid for analysis has been normally used in the decreasing operation based on correspondence between both the densities, or determine that the liquid for analysis has not been normally used in the decreasing operation based on disagreement between both the densities.

According to another aspect, the liquid-for-analysis determining part is configured to determine a volume V' of the decrease in the liquid in the container in the decreasing operation by dividing the variation $\Delta M$ between a weight of the container before the decreasing operation and a weight of the container after the decreasing operation by the density $\rho$ of the liquid for analysis stored in the density storing part, compare the determined volume V' with the volume V of the decrease in the liquid in the container in the decreasing operation, and determine that the liquid for analysis has been normally used in the decreasing operation based on correspondence between both the volumes, or determine that the liquid for analysis has not been normally used in the decreasing operation based on disagreement between both the volumes.

These aspects are effective if a normal volume V of a decrease in a liquid for analysis in a decreasing operation that decreases the liquid for analysis is calculated using preset analysis program, for example. If an analyzer has a function that calculates an amount of feeding of a liquid for analysis based on an amount of an operation of a feed pump, a volume V of consumption of a liquid for analysis in a decreasing operation is calculated using the function of the analyzer.

A volume V of consumption of a liquid for analysis consumed in a decreasing operation that decreases the liquid for analysis may not be accurately grasped. In this case, a volume proportion between consumption of a plurality of kinds of liquids for analysis consumed in gradient liquid feeding, for example, is calculated using analysis program. The liquid-for-analysis determining part determines whether the liquids for analysis have been normally used or not based on the proportion.

That is, the weighing scale weighs a plurality of containers, the density storing part stores densities ρ of liquids for analysis, and the liquid-for-analysis determining part is configured to obtain a proportion between calculated volumes V' of decreases in liquids in the plurality of containers in a decreasing operation by dividing variations ΔM between weights of the plurality of containers before the decreasing operation and weights of the plurality of containers after the decreasing operation by the densities ρ of the liquids for analysis stored in the density storing part (the calculated volumes V' do not necessarily correspond to actual volumes), compare the obtained proportion between the calculated volumes V' with a proportion between volumes V of decreases in the liquids in the plurality of containers in the decreasing operation, that is, a normal consumption proportion between the liquids for analysis in the decreasing operation, and determine that the liquids for analysis have been normally used in the decreasing operation based on correspondence between both the proportions, or determine that the liquids for analysis have not been normally used in the decreasing operation based on disagreement between both the proportions. Therefore, even if correct volumes V of decreases in the liquids for analysis in the decreasing operation are not accurately calculated, a proportion between calculated volumes of decreases in the liquids in the containers obtained based on the variations ΔM between weights of the containers and the densities ρ of the liquids for analysis is compared with a consumption proportion between the liquids for analysis based on the analysis program to determine whether the liquids for analysis are normally used or not.

Further, the liquid-for-analysis monitor according to an aspect of the present invention may further include a warning part that gives warning to a user when the liquid-for-analysis determining part determines that the liquid(s) for analysis has/have not been normally used in the decreasing operation. As a result, a user easily notices and quickly deals with disposition of a wrong liquid for analysis, a liquid for analysis connected to a wrong pipe, or an analyzer not normally operating.

An liquid-for-analysis monitor according to an aspect of the present invention uses information on weights of containers that contain liquids as liquid for analysis, and information on densities ρ of the liquids for analysis, and thus determines whether liquids that need to be used are used as scheduled in a decreasing operation that decreases liquids for analysis, such as feeding of a mobile-phase solvent, feeding of a cleaning liquid, and adding a reagent to a sample.

DETAILED DESCRIPTION OF THE INVENTION

Figure 1:
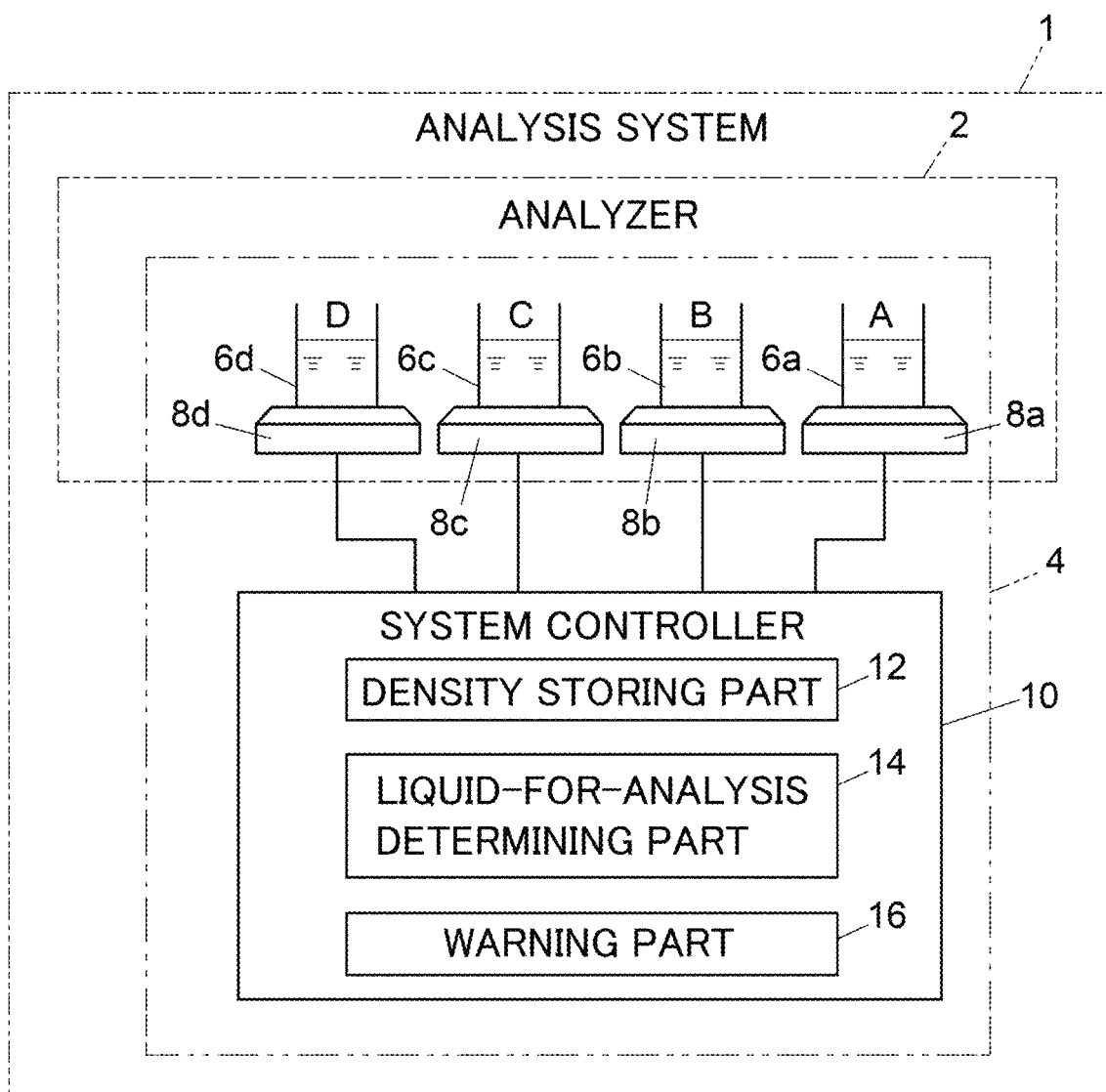
FIG. 1 is a schematic block diagram that shows one embodiment of a liquid-for-analysis monitor.

Hereinafter, one embodiment of a liquid-for-analysis monitor according to the present invention will be described referring to the drawings.

FIG. 1 shows one example of configurations of the liquid-for-analysis monitor an analysis system 1 includes. The analysis system 1 includes an analyzer 2 and a system controller 10. The system controller 10 is a special computer or a general personal computer.

The analyzer 2 uses a plurality of liquids to perform analysis, like a liquid chromatograph, for example. Containers 6a to 6d that contain liquids as liquids A to D for analysis that are used for analysis are disposed in the analyzer 2, according to rules. If the containers 6a to 6d that contain the liquids A to D for analysis are correctly disposed, the analyzer 2 sucks liquids for analysis that are necessary for an analysis operation from the containers 6a to 6d with a feed pump or a sampling needle and uses the sucked liquids. Disposing the containers 6a to 6d includes disposing the containers 6a to 6d at specific positions, or connecting the containers 6a to 6d to specific pipes.

The liquids A to D for analysis that need to be contained in the containers 6a to 6d include solvents as mobile phases fed through an analysis flow path in a liquid chromatograph, cleaning liquids that clean an inside of the analysis flow path, reagents added to samples, and diluting liquids, for example.

The analysis system 1 includes a liquid-for-analysis monitor 4 that monitors whether operations that decrease liquids for analysis, such as feeding of a mobile phase, use correct liquids for analysis as scheduled or not. In the present embodiment, the liquid-for-analysis monitor 4 includes weighing scales 8a to 8d and the system controller 10. The weighing scales 8a to 8d weigh the containers 6a to 6d, respectively, and are electronic scales, for example.

The system controller 10 includes a density storing part 12, a liquid-for-analysis determining part 14, and a warning part 16. The density storing part 12 is a function implemented by some memory sectors of a storage device of the system controller 10. The liquid-for-analysis determining part 14 and the warning part 16 are functions implemented by program performed by arithmetic elements, such as a microcomputer.

The density storing part 12 stores information on densities of the liquids A to D for analysis that needs to be contained in the analyzer 2.

When a decreasing operation has decreased some liquids for analysis (e.g. feeding of a mobile phase or cleaning with a cleaning liquid), the liquid-for-analysis determining part 14 determines whether the decreasing operation has used correct liquids for analysis as scheduled or not, based on differences ΔM between weights M1 of containers that correspond to the liquids for analysis at a time and a weights M2 of the containers after a period of time passes that is sufficiently long for measurement of the decreases in liquids in the container, densities ρ of liquids for analysis that need to be used in the decreasing operation, and volumes V of consumption of the liquids for analysis in the decreasing operation (or a proportion between volumes V).

The liquid-for-analysis determining part 14 may perform the determination when analysis is started, for example. The liquid-for-analysis determining part 14 receives a consumption proportion between the liquids A to D for analysis from preset analysis program. If the liquids A and B for analysis are used to perform gradient liquid feeding in an analysis, for example, the liquid-for-analysis determining part 14 receives measurement values of weights $M_{A0}$ and $M_{B0}$ of the containers 6a and 6b at a start of the gradient liquid feeding and stores the measurement values in a memory element, for example. After a fixed period of time passes from the start of the gradient liquid feeding, the liquid-for-analysis determining part 14 receives measurement values of weights $M_{A1}$ and $M_{B1}$ of the containers 6a and 6b, and obtain variations $\Delta M_A$ and $\Delta M_B$ in weights of the containers 6a and 6b by calculating differences $M_{A0}$-$M_{A1}$ and $M_{B0}$-$M_{B1}$.

If the analyzer 2 has a function that measures an amount of feeding of each mobile phase, or if amounts of consumption of liquids in the containers 6a and 6b are calculated using the analysis program, the liquid-for-analysis determining part 14 calculates actual volumes $V_A$ and $V_B$ of decreases in the liquids in the containers 6a and 6b. Further, the liquid-for-analysis determining part 14 obtains densities $\rho'_A$ and $\rho'_B$ of the liquids in the containers 6a and 6b by dividing the variations $\Delta M_A$ and $\Delta M_B$ in weights of the containers 6a and 6b by the volumes $V_A$ and $V_B$ of the decreases, respectively, and compares the densities $\rho'_A$ and $\rho'_B$ with densities $\rho_A$ and $\rho_B$ of the liquids A and B for analysis stored in the density storing part 12. If the containers 6a and 6b contain correct liquids A and B for analysis, respectively, $\rho'_A = \rho_A$ and $\rho'_B = \rho_B$. Therefore, if $\rho'_A = \rho_A$ and $\rho'_B = \rho_B$, the liquid-for-analysis determining part 14 determines "normal use." On the other hand, if $\rho'_A \neq \rho_A$ and/or $\rho'_B \neq \rho_B$, the liquid-for-analysis determining part 14 determines that the container(s) the densities of which do not correspond with each other contain(s) a liquid that is not a liquid for analysis that needs to be contained. In this case, the liquid-for-analysis determining part 14 determines "abnormal use." Correspondence between the densities is determined by a fact that a calculated density ρ' falls within a range of a margin of error of a density of each liquid for analysis (e.g. density ρ of each liquid for analysis ±10%) or not.

If amounts of consumption of the liquids in the containers 6a and 6b are not calculated, the liquid-for-analysis determining part 14 receives a consumption proportion $V_A:V_B$ between the liquids A and B for analysis from the analysis program, and determines whether the liquids for analysis are normally used or not based on the consumption proportion. In this case, the liquid-for-analysis determining part 14 obtains calculated volumes $V'_A$ and $V'_B$ of decreases in the liquids in the containers 6a and 6b by dividing the variations $\Delta M_A$ and $\Delta M_B$ in weights of the containers 6a and 6b by the densities $\rho_A$ and $\rho_B$ of the liquids A and B for analysis, respectively. The liquid-for-analysis determining part 14 compares a proportion $V'_A:V'_B$ with a consumption proportion $V_A:V_B$ between the liquids A and B for analysis received from the analysis program. If both the proportions correspond with each other, the liquid-for-analysis determining part 14 determines "normal use." If both the proportions do not correspond with each other, the liquid-for-analysis determining part 14 determines "abnormal use."

When the liquid-for-analysis determining part 14 determines "abnormal use," the warning part 16 gives warning to a user. For example, the warning may be displayed on a monitor connected to the system controller 10 and inform of abnormal use. Alternatively, the warning may be warning sound.

Figure 2:
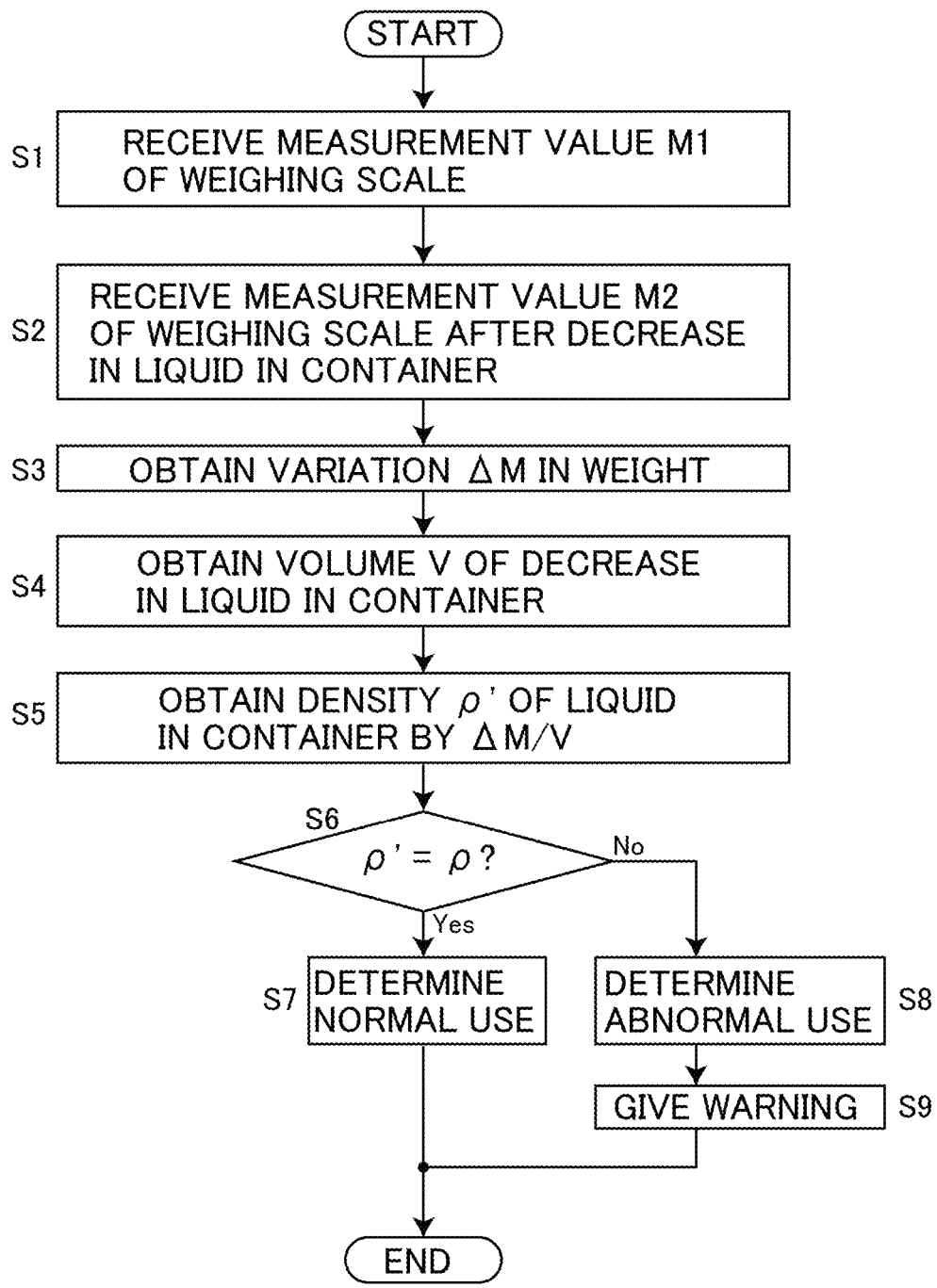
FIG. 2 is a flowchart that shows one example of monitoring operations that monitor liquids for analysis.

Further, when the liquid-for-analysis determining part 14 determines "abnormal use," the system controller 10 may transmit an instruction to the analyzer 2 so that the analyzer 2 interrupts a current operation, in addition to or instead of the warning An example of monitoring operations in which the liquid-for-analysis monitor monitors liquids for analysis will be described referring to FIG. 1 and a flowchart in FIG. 2. The monitoring operation is effective if amounts of consumption of the liquids A to D for analysis consumed in an operation of the analyzer 2 are calculated. The liquid A for analysis will be exemplified.

Firstly, the liquid-for-analysis determining part 14 receives a weight M1 of the container 6a that corresponds to the liquid A for analysis from the weighing scale 8a at a time during an operation that consumes the liquid A for analysis (e.g. a start of the operation) (step S1). After a period of time passes that is sufficiently long for measurement of decrease in weight of the container 6a, the liquid-for-analysis determining part 14 receives a weight M2 of the container 6a from the weighing scale 8a (step S2), and obtains a variation $\Delta M_A$ in weight of the container 6a (step S3).

The liquid-for-analysis determining part 14 obtains an amount of consumption of a liquid in the container 6a in a decreasing operation that decreases a weight of the container 6a by $\Delta M_A$ using a function of the analyzer 2 or by calculation based on the analysis program (step S4). The obtained amount of consumption of the liquid corresponds to a volume $V_A$ of a decrease in a liquid in the container 6a in the decreasing operation. The liquid-for-analysis determining part 14 obtains a density $\rho'_A$ of the liquid in the container 6a by dividing the variation $\Delta M_A$ in weight by the obtained volume $V_A$ (step S5). The obtained density $\rho'_A$ is compared with a density $\rho_A$ of the liquid A for analysis stored in the density storing part 12 (step S6). If both the densities correspond with each other, the liquid-for-analysis determining part 14 determines "normal use" (step S7). If both the densities do not correspond with each other, the liquid-for-analysis determining part 14 determines "abnormal use" (step S8).

If the liquid-for-analysis determining part 14 determines "abnormal use," the warning part 16 gives warning to a user to inform of the "abnormal use" (step S9).

Figure 3:
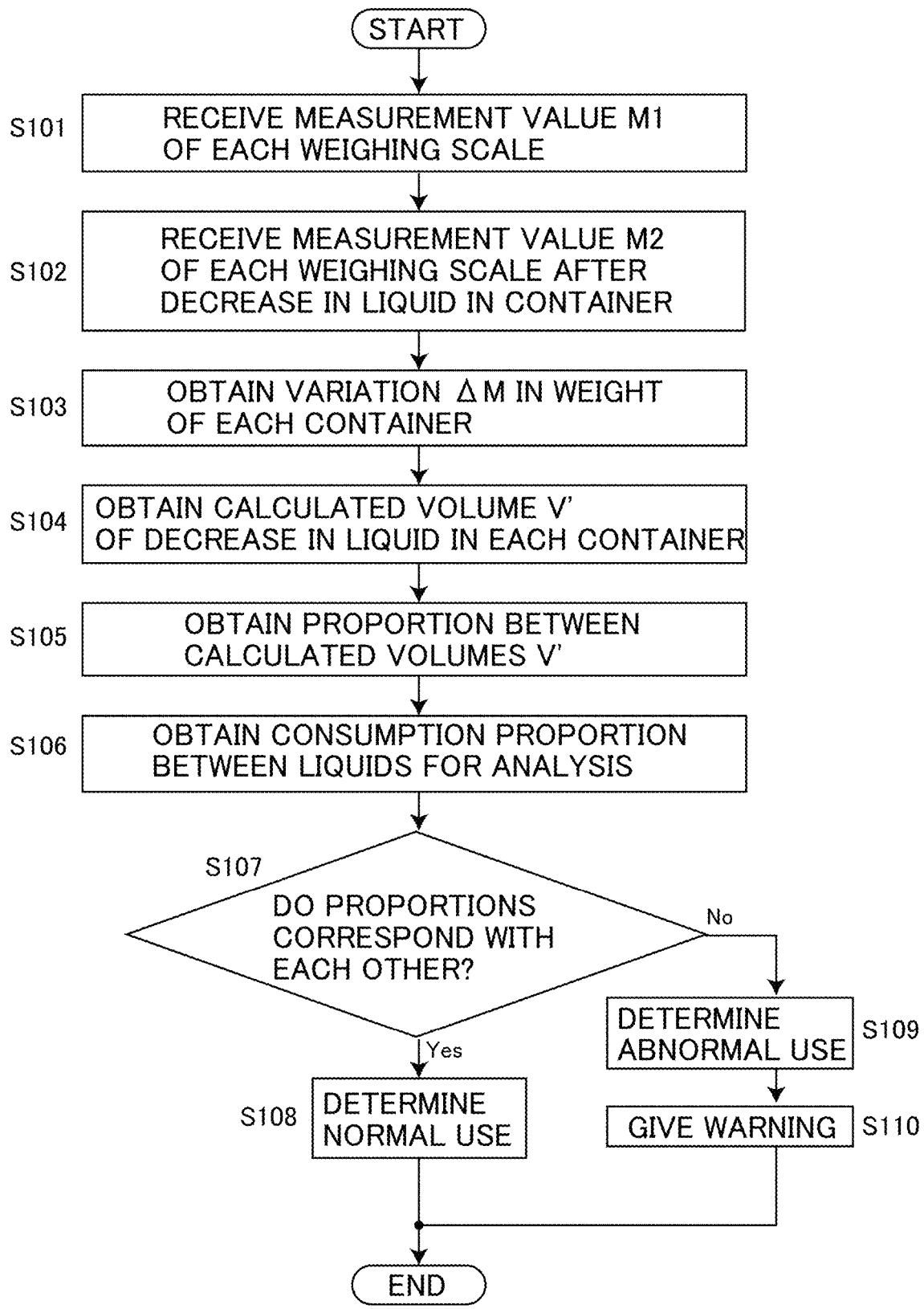
FIG. 3 is a flowchart that shows another example of monitoring operations that monitor liquids for analysis.

Another example of monitoring operations in which the liquid-for-analysis monitor monitors liquids for analysis will be described referring to FIG. 1 and a flowchart in FIG. 3. The monitoring operation is especially effective if amounts of consumption of the liquids A to D for analysis consumed in an operation of the analyzer 2 are not calculated. The liquids A and B for analysis will be exemplified.

Firstly, the liquid-for-analysis determining part 14 receives weights $M_{A1}$ and $M_{B1}$ of the containers 6a and 6b that correspond to the liquids A and B for analysis from the weighing scales 8a and 8b at a time during an operation that consumes the liquids A and B for analysis (e.g. a start of the operation) (step S101). After a period of time passes that is sufficiently long for measurement of decreases in weights of the containers 6a and 6b, the liquid-for-analysis determining part 14 receives weights $M_{A2}$ and $M_{B2}$ of the containers 6a and 6b from the weighing scales 8a and 8b (step S102), and obtains variations $\Delta M_A$ and $\Delta M_B$ in weights of the containers 6a and 6b (step S103).

Next, the liquid-for-analysis determining part 14 obtains calculated volumes $V'_A$ and $V'_B$ of decreases in liquids in the containers 6a and 6b by dividing the variations $\Delta M_A$ and $\Delta M_B$ in weights of the containers 6a and 6b by densities $\rho_A$ and $\rho_B$ of the liquids A and B for analysis, respectively (step S104), and obtains a proportion $V'_A:V'_B$ (step S105). Then, the liquid-for-analysis determining part 14 receives a consumption proportion $V_A:V_B$ between the liquids A and B for analysis from the analysis program (step S106), and compares the calculated proportion $V'_A:V'_B$ with the consumption proportion $V_A:V_B$ (step S107). If both the proportions correspond with each other, the liquid-for-analysis determining part 14 determines "normal use" (step S108). Alternatively, if both the proportions do not correspond with each other, the liquid-for-analysis determining part 14 determines "abnormal use" (step S109).

If the liquid-for-analysis determining part 14 determines "abnormal use," the warning part 16 gives warning to a user to inform of the "abnormal use" (step S110).

As described above, when liquids in the disposed containers 6a to 6d decrease by some amounts, the liquid-for-analysis monitor 4 described above determines whether liquids for analysis that need to be used are used as scheduled in an operation or not, based on variations $\Delta M$ between weights of the containers 6a to 6d before the decrease and weights of the containers 6a to 6d after the decrease, densities $\rho$ of corresponding liquids for analysis, and amounts of consumption of liquids in the containers 6a to 6d or a consumption proportion between liquids in the containers 6a to 6d in a decreasing operation. Consequently, if a user does not correctly dispose the liquids A to D for analysis or connects the liquids A to D for analysis to wrong tubes, for example, the liquid-for-analysis monitor 4 detects the error as abnormal use when an operation that consumes the liquids for analysis starts.

DESCRIPTION OF REFERENCE NUMERAL

1 Analysis system
2 Analyzer
4 Liquid-for-analysis monitor
6a-6d Container
8a-8d Weighing scale
10 System controller
12 Density storing part
14 liquid-for-analysis determining part
16 Warning part

What is claimed is:

1. A liquid-for-analysis monitor comprising:
a weighing scale that weighs a container containing a liquid as a liquid for analysis that needs to be used in analysis;
a density storing part that stores a density $\rho$ of the liquid for analysis; and
a liquid-for-analysis determining part configured to obtain a variation $\Delta M$ between a weight of the container weighed by the weighing scale before a decreasing operation that decreases the liquid and a weight of the container weighed by the weighing scale after the decreasing operation, to calculate an actual volume V of the decrease in the liquid in the container in the decreasing operation, and to determine whether the liquid which has been used actually in the decreasing operation is the liquid for analysis which should have been used in the decreasing operation, based on the obtained variation $\Delta M$, the actual volume V, and the density $\rho$ of the liquid for analysis stored in the density storing part, wherein
the liquid-for-analysis determining part is configured to obtain a density $\rho'$ of the liquid contained in the container by dividing the variation $\Delta M$ between a weight of the container before the decreasing operation and a weight of the container after the decreasing operation by the actual volume V of the decrease in the liquid in the container in the decreasing operation, to compare the obtained density $\rho'$ with the density $\rho$ of the liquid for analysis stored in the density storing part, and to determine whether the liquid which has been used actually in the decreasing operation is the liquid for analysis which should have been used in the decreasing operation based on whether the density $\rho'$ and the density $\rho$ are agree with each other.

2. A liquid-for-analysis monitor comprising:
a weighing scale that weighs a container containing a liquid as a liquid for analysis that needs to be used in analysis;
a density storing part that stores a density $\rho$ of the liquid for analysis; and
a liquid-for-analysis determining part configured to obtain a variation $\Delta M$ between a weight of the container weighed by the weighing scale before a decreasing operation that decreases the liquid and a weight of the container weighed by the weighing scale after the decreasing operation, to calculate an actual volume V of the decrease in the liquid in the container in the decreasing operation, and to determine whether the liquid which has been used actually in the decreasing operation is the liquid for analysis which should have been used in the decreasing operation, based on the obtained variation $\Delta M$, the actual volume V of the decrease in the liquid in the container in the decreasing operation, and the density $\rho$ of the liquid for analysis stored in the density storing part, wherein
the liquid-for-analysis determining part is configured to obtain a volume V' of the decrease in the liquid in the container in the decreasing operation by dividing the variation $\Delta M$ between a weight of the container before the decreasing operation and a weight of the container after the decreasing operation by the density $\rho$ of the liquid for analysis stored in the density storing part, to compare the obtained volume V' with the actual volume V of the decrease in the liquid in the container in the decreasing operation, and to determine whether the liquid which has been used actually in the decreasing operation is the liquid for analysis which should have been used in the decreasing operation based on whether the volume V' and the actual V are agree with each other.

3. A liquid-for-analysis monitor comprising:
a weighing scale that weighs a container containing a liquid as a liquid for analysis that needs to be used in analysis;
a density storing part that stores a density $\rho$ of the liquid for analysis; and
a liquid-for-analysis determining part configured to obtain a variation $\Delta M$ between a weight of the container weighed by the weighing scale before a decreasing operation that decreases the liquid and a weight of the container weighed by the weighing scale after the decreasing operation, to calculate an actual volume V of the decrease in the liquid in the container in the decreasing operation, and to determine whether the liquid which has been used actually in the decreasing operation is the liquid for analysis which should have been used in the decreasing operation, based on the obtained variation $\Delta M$, the actual volume V of the decrease in the liquid in the container in the decreasing operation, and the density $\rho$ of the liquid for analysis stored in the density storing part, the liquid-for-analysis monitor, further comprising a plurality of containers that contain a plurality of liquids as different liquids for analysis, respectively, wherein the weighing scale weighs the plurality of containers, the density storing part stores densities $\rho$ of the liquids for analysis;

the liquid-for-analysis determining part configured to obtain a proportion between calculated volumes V' of decreases in liquids in the plurality of containers in the decreasing operation by dividing variations $\Delta M$ between weights of the plurality of containers before the decreasing operation and weights of the plurality of containers after the decreasing operation by the densities $\rho$ of the liquids for analysis stored in the density storing part, to compare the obtained proportion between the calculated volumes V' with a proportion between the actual volumes V of decreases in liquids in the plurality of containers in the decreasing operation, and to determine whether the liquids which have been used actually in the decreasing operation are each liquids for analysis which should have been used in the decreasing operation based on whether the proportion between the calculated volumes V' and the proportion between the actual volumes V are agree with each other.

4. The liquid-for-analysis monitor according to claim 1, further comprising a warning part that gives warning to a user when the liquid-for-analysis determining part determines that the liquid which has been used actually in the decreasing operation is not the liquid for analysis which should have been used in the decreasing operation.

5. The liquid-for-analysis monitor according to claim 2, further comprising a warning part that gives warning to a user when the liquid-for-analysis determining part determines that the liquid which has been used actually in the decreasing operation is not the liquid for analysis which should have been used in the decreasing operation.

6. The liquid-for-analysis monitor according to claim 3, further comprising a warning part that gives warning to a user when the liquid-for-analysis determining part determines that the liquids which have been used actually in the decreasing operation are each not the liquids for analysis which should have been used in the decreasing operation.

* * * * *